United States Patent [19]

Allen

[11] 4,149,352
[45] Apr. 17, 1979

[54] MODULAR PANEL APPARATUS

[76] Inventor: David L. Allen, P. O. box 81121, Atlanta, Ga. 30366

[21] Appl. No.: 923,108

[22] Filed: Jul. 10, 1978

Related U.S. Application Data

[63] Continuation of Ser. No. 808,197, Jun. 20, 1977, abandoned.

[51] Int. Cl.² .............................................. F16B 7/22
[52] U.S. Cl. ....................................... 52/476; 52/656; 403/231
[58] Field of Search .................. 52/475, 476, 656–658; 403/20, 169, 174, 178, 177, 292, 297, 296, 231, 408, 406; 160/402

[56] References Cited

U.S. PATENT DOCUMENTS

| 885,097 | 4/1908 | Steely | 160/402 |
|---|---|---|---|
| 1,594,282 | 7/1926 | Trimble | 160/402 X |
| 2,792,612 | 5/1957 | Wickliffe | 160/402 X |
| 3,445,080 | 7/1969 | Meadows | 52/476 |
| 3,864,051 | 2/1975 | Reid | 52/656 X |
| 3,977,800 | 8/1976 | Cassel | 403/297 X |
| 4,012,153 | 3/1977 | Pidgeon et al. | 52/656 X |
| 4,021,127 | 5/1977 | Gasparro et al. | 52/475 X |

FOREIGN PATENT DOCUMENTS

| 2237044 | 2/1974 | Fed. Rep. of Germany | 403/297 |
| 567174 | 9/1975 | Switzerland | 403/297 |

Primary Examiner—J. Karl Bell
Attorney, Agent, or Firm—Jones, Thomas & Askew

[57] ABSTRACT

Modular panel apparatus which is particularly useful for providing wall partitions and divider panels of varied sizes and configurations. A panel frame having a rectangular or another polygonal shape is assembled from tubular members that are interconnected together with corner members which lock the tubular members to form a rigid frame. A panel of suitable dimensions is then positioned within the frame, and the panel is held in place by retaining members which removably fit over the frame and secure the panel in place. Panel members of various standard or nonstandard sizes and configurations may be accommodated within corresponding frames.

5 Claims, 8 Drawing Figures

MODULAR PANEL APPARATUS

This is a continuation of application Ser. No. 808,197, filed June 20, 1977 now abandoned.

This invention relates in general to panel apparatus and in particular to modular panel apparatus which can assume many selected sizes and configurations.

The need frequently arises to temporarily enclose an area, whether partially or completely, by erecting walls or similar structure which surrounds the desired area. One such need is found in displays that are frequently used in conjunction with conventions, expositions, and the like, where suppliers of products and services will have booths with their wares on display. Most displays of that sort are in rented space and will remain at any given location for only a relatively short duration. For that reason, the walls and other structural members which physically enclose or define the display booths must be removed after the event is concluded, typically to make way for some unrelated event.

One technique of erecting such display booths would be to construct booths from scratch for each occasion, using the services of one or more carpenters and starting with basic lumber, nails, and other building supplies. The cost of such basic construction for display booths or other structures which may have a lifetime of only a few days is clearly prohibitive, however. The value of the lumber and the erection time would be largely unrecoverable, moreover, since the display booths would typically be torn down or otherwise demolished after their brief period of use. Attempting to store the booths for reuse at a later time is impractical in most instances, because of the costs associated with storing and subsequently refurbishing used booths, and also because of the practical difficulty in fitting a present customer's display requirements within an existing booth.

Efforts have been made to overcome the foregoing problem by providing modular panels which are made in certain predetermined sizes, and which can be fitted together relatively rapidly to make up a display booth or other structure. Such modular panel construction of the prior art has typically taken the form of panel members equipped with built-in connectors which can fasten that panel to other such panels or to related hardware as necessary to erect and support a wall partition or the like. Since the panel and its preassembled interconnecting hardware are integral in the art, such hardware-equipped panels are generally manufactured at a factory in several predetermined sizes which could be purchased for subsequent use, disassembly, and possible reuse. While such modular panels of the prior art are an imrovement over from-scratch construction methods for many applications, the fact that such panels must be preassembled with the necessary hardware greatly adds to the cost and weight of the panels. Moreover, persons who are designing and constructing display booths from such modular panels of the prior art are constrained to design booths which can be pieced together from the limited number of standard-size panels that are available from the manufacturer, since the size of individual panels cannot be readily changed at the building site.

Accordingly, it is an object of the present invention to provide an improved modular panel apparatus.

It is another object of the present invention to provide modular panel apparatus which is readily assembled and disassembled, and which may readily take an infinite number of standard or nonstandard sizes and configurations.

It is still another object of the present invention to provide modular panel apparatus which is relatively lightweight.

Stated in general terms, the modular panel apparatus of the present invention comprises a frame which is rigidly and removably assembled in the outline of a rectangle or another polygon having the size and configuration of a desired panel member. A panel is provided which fits within the frame, and means are provided to removably secure the panel within the frame. Stated somewhat more particularly, the frame may be made of tubular members that are joined together by a number of corner members which rigidly engage and interlock the tubular members to form a rigid frame of rectangular or other polygonal configuration. The panels may be held in plce within the tubular frame by members which resiliently fit over the tubular members to retain the panel. Except for the corner members and inter-panel connections, the present modular panel apparatus comprises components that can easily and inexpensively be cut from stock to fit a number of nonstandard sizes and configurations, in addition to being available from precut standard sizes.

The objects, advantages, and specific nature of the present invention will become more readily apparent from the following description of a preferred embodiment, and from the drawing in which:

FIG. 3 is a vertical section view of one embodiment of corner member used with the disclosed modular panel;

FIG. 3A is an end view showing one of the stems in the corner member of FIG. 3;

FIG. 4 shows a panel interconnector used with the disclosed modular panel;

FIG. 5 shows an alternative disclosed embodiment of corner member according to the present invention;

FIG. 6 shows an alternative embodiment of panel interconnector according to the present invention; and FIG. 7 shows a fragmentary pictorial view of a retaining clip for securing the panel in place on the tubular members.

Figure 1:
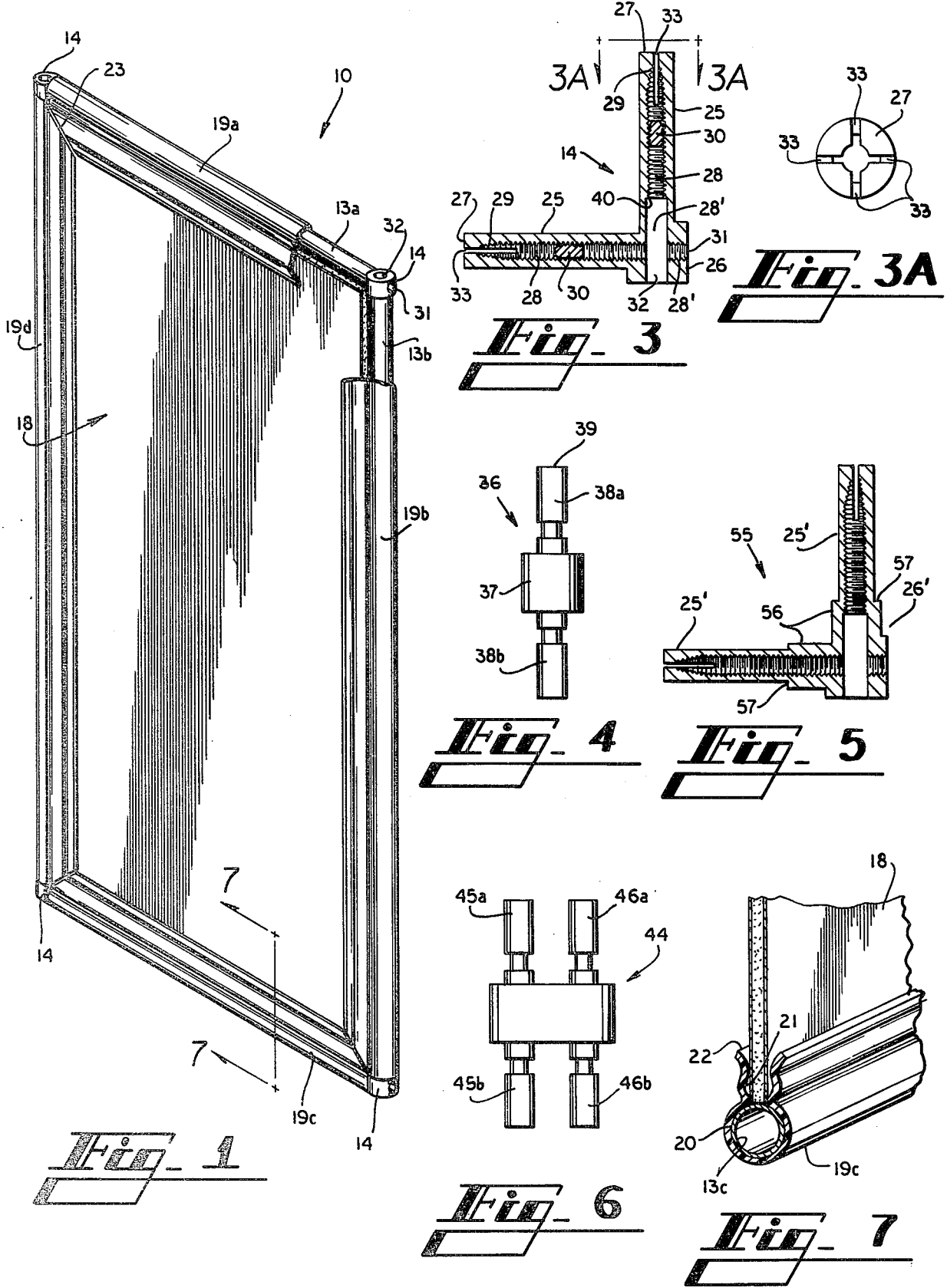
FIG. 1 shows a pictorial view of an assembled modular panel according to a disclosed embodiment of the present invention.
Figure 2:
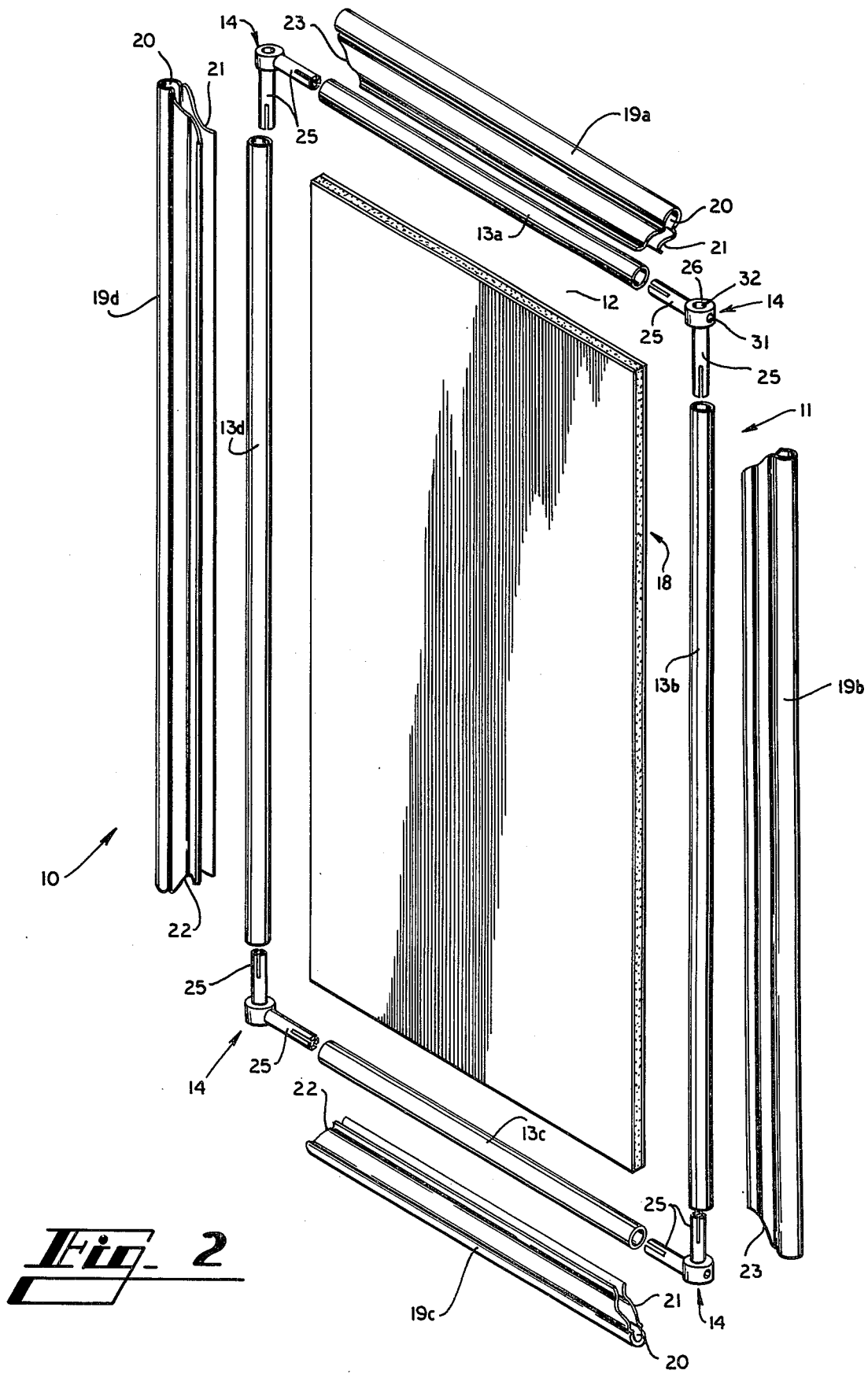
FIG. 2 shows an exploded view of the panel shown in FIG. 1.

Turning to FIGS. 1 and 2, there is shown generally at 10 a panel module constructed according to the present invention and having a rectangular configuration. The panel module 10 is shown in exploded view at FIG. 2, and it can be seen that this panel module has a rectangular frame which is indicated generally at 11 and which surrounds and defines an interior region 12 within the frame. The frame 11 is defined by tubular members 13a, 13b, and 13d which are detactably joined together by the four separate corner members collectively indicated at 14.

Received within the region 12 defined by the frame 11 is a flat panel 18, which also has a rectangular configuration in the disclosed embodiment so as to fit closely within the region 12 without interfering with any of the tubular members 13a-13d. The panel 18 is retained in place within the frame 11 by means of the retainers 19a, 19b, 19c, and 19d which fit over the corresponding tubular members 13a-13d to engage and retain the panel. Each of the retainers 19a-19d, as best seen in FIG. 2 and FIG. 7, has a generally cylindrical hollow interior portion 20 which is configured to fit snugly about the exterior of a tubular frame member, and also has a relatively narrow open throat portion 21 whose width is preferably slightly less than the thickness of the panel 18. The retainers 19 may be molded or otherwise formed from a suitable resilient material such as plastic or the like, so that the retainers are sufficiently resilient to be manually forced over the tubular members 13a to 13b to assume the final position shown in FIG. 1, for example, wherein the tube 13a is received within the interior portion 20 of the retainer 19a and the upper edge of the panel 18 is held between the throat portion 21 of the retainer. The outer edges of the throat portion 21 are preferably flared outwardly as shown at 22 in FIG. 7, to facilitate urging the resilient retainers over the tubular members. Portions of the ends of each tubular member 19 may be mitered at 45° angles as shown at 23, in the case of a rectangular frame 11, so as to provide a finished appearance to the overall panel module 10.

The panel 18 may be fabricated from any suitable material which will provide the desired wall or other panel construction. Since lightness of weight may be an important consideration in many applications, the panel 18 may have a rigid foamed plastic core covered on either or both sides by a fabric or other material which will protect the core and present a pleasing appearance. Other materials from which panels 18 may be made will be apparent to those skilled in the art.

The tubular members 13a–13d may be made of metal, plastic, or other tubing having the desired diameter and structural characteristics, and it is contemplated that these tubular members will usually be hollow along their entire length. The tubular members may also be of arcuate or other nonlinear shape, if desired. It is only necessary, however, that the ends of the tubular members be hollow for a length sufficient to receive the stems 25 which form part of each corner member 14.

Details of one disclosed embodiment of corner member 14 may best be seen in FIG. 2 and FIG. 3. The corner member 14 has a central body 26 from which extend a pair of stems 25 at right angles to each other. The outer diameter of each stem 25 is selected so that the stems fit snugly within the inner diameter of the hollow ends of each tubular member.

The outer end 27 of each stem 25 is split into several sectors, such as four sectors in the disclosed embodiment, by means of the crosswise cuts 33 (FIG. 3A) which commence at the outer end 27 and extend longitudinally back a distance along the length of each stem 25. The interior of each stem 25 has a hollow passage 28 which joins with a corresponding passage 28' coaxially aligned within the body 26 of the corner member. The hollow passage 28 within each stem 25 is seen to terminate at a location 29 which is within the split-end region of the stem, but which stops short of the outer end 27 of the stem. Each of the passages 28 internally is threaded to receive a set screw 30.

The two hollow passages 28' within the body 26 terminate at openings 31 and 32 located on outer sides of the body opposite from the corresponding stems 25, thereby providing access to the set screws 30 contained within the passages 28 of the stems 25. It is apparent from FIG. 3 that at least one of the hollow passages 28' within the body 26, such as the passage which terminates at the opening 32, is enlarged relative to the connecting passage 28' of the other stem 25. The purpose for this enlargement of the body passage is explained below.

The manner of assemblying and disassembling the panel module as thus described is now discussed. When a panel module 10 of certain overall dimensions is desired, a frame 11 is first assembled from tubular members 13a–3d having the appropriate dimensions. It will be apparent that a supply of tubular members precut to various standard lengths can be provided, so that panel modules of standard or frequently-occurring sizes can be assembled even more rapidly. The selected tubular members are joined together by simply inserting the stems 25 of corner members 14 into the hollow ends of the tubular members, after which the set screws 30 in each tubular member are moved toward the ends 29 of the hollow passages 28 in the stems. The set screws 30 thus cause the split outer ends 27 of the stems to spread apart so as to firmly engage the inner diameter of the tubular members. A rigid frame 11 having the overall dimensions and the configuration of the desired panel module is thus obtained.

A suitable panel 18 may now be disposed within the frame 11 as provided. As with the case of the tubular members, it is apparent that a number of panels 18 of standard configuraion may be precut to satisfy standard or frequently-occurring dimensional requirements. It should also be apparent, however, that panels 18 of nonstandard size can readily be cut from panel stock, since the panel 18 contains no hardware or other fittings for engagement with the surrounding frame 11, or with other panel modules.

The panel 18, once positioned within the frame 11, is engaged and retained by slipping the retainers 19a–19d in place over the corresponding tubular members 13a–13d. The throat portion 21 of each retainer securely holds an outer edge of the panel 18, as exemplified in FIG. 7, so that there is provided a panel module 10 which is relatively lightweight and easy to handle, yet which is rigid and cannot inadvertently come apart.

The panel module 10 may be disassembled simply by reversing the foregoing assembly steps. The corner members 14 may obviously be reused to assemble subsequent panels, and other panel module components of standard dimension may also be reused to assemble other panels.

Since display booths and other types of structures are frequently made up of a number of panel modules and other elements such as doors, door frames, and the like, it becomes necessary to provide some means for interconnecting a panel module 10 with other such modules or with other structural components. Such interconnection is provided by connectors such as seen in FIGS. 4 and 6, along with the enlarged passage 28' in the body 26 of the corner members 14.

FIG. 4 shows a single connector 36 having a central body 37 from opposite sides of which extend a pair of coaxial stems 38a and 38b. The diameter of each stem 38a and 38b is selected to provide a snug fit within the corresponding diameter of the enlarged passage 28' within the body 26. The outer end 39 of each connector stem 38a and 38b rest against the shoulder 40 defined by the inner end of the enlarged passage 28' within the body 26. Thus, one stem 38a of the connector 36 can fit within a corner member 14 of a first panel module, while the opposed stem 38b of the connector fits within a corner member of an adjacent panel module. A separate set screw (not shown in the drawings) can then be inserted through the opening 31 of the corner member and moved along the threaded passage 28' to engage the surface of the connector stem which is received within the enlarged passage of the body 26. In that manner, two or more panel modules can be quickly and inexpensively interconnected to provide a wall of any desired extent.

FIG. 6 shows a double connector 44 having a first pair of coaxially-aligned stems 45a and 45b, laterally spaced apart from a second pair of stems 46a and 46b. The double connector 44 is used, for example, for interconnecting the four adjacent corner members of four panel modules.

It will be apparent that connectors of other configurations can be provided within the scope of the present invention. For example, a four-way connector can be provided in which four stems extend outwardly from a body at mutual right angles to each other, so that panel modules can be interconnected to occupy planes that are separated by a right angle.

Another embodiment of corner member is shown at 55 in FIG. 5. The corner member 55 has stems 25' which extend outwardly from base members 56 having a cylindrical configuration with an outer diameter which is substantially the same as the outer diameter of the tubular members 13 with which the corner member 55 will be used. The interconnection of each stem 25' with the corresponding base member 56 defines a shoulder 57 against which an end of a tubular member rests. The stems 25' of the corner member 55 have split ends which are internally expanded by set screws for engaging the tubular members, in the same manner as described above with respect to the corner member 14 shown in FIG. 3.

It will be apparent from the foregoing that there has been described modular panel apparatus from which panel modules of various standard or nonstandard sizes and shapes can be readily assembled and disassembled, without need of stocking any prepared panels with pre-attached hardware or other fittings for interconnection. Panel modules according to the present invention can be provided in polygonal shapes other than the disclosed rectangular shape, by providing corner members with the appropriate angular separation between stems. Moreover, it will be understood that the modules panel apparatus of the present invention is not limited in application to display booths or the like. It should also be understood that the foregoing relates only to disclosed preferred embodiments of the present invention, and that numerous changes and modifications may be made therein without departing from the spirit and the scope of the invention as set forth in the following claims.

What is claimed is:

1. Modular panel apparatus comprising:
   a plurality of generally elongate individual members interconnected together by connecting means so as to define a polygonal frame;
   panel means configured to fit within said frame;
   retaining means mounted on said elongate member and operative to detachably retain said panel means within said frame, so that said panel means becomes part of said polygonal frame;
   said connecting means comprising a body member and a pair of selectably expandable and contractable tubular members which extend outwardly from said body member to fit within mating hollow ends of an adjacent pair of said elongate frame members;
   each of said tubular members having a hollow interior passage which is threaded to receive a screw, and having an internally tapered portion which is selectably expandable when said screw is therewithin;
   said body member having a separate internal access passage axially aligned with said interior passage of each said tubular member, for access to said screws; and
   at least one of said access passages having an enlarged diameter relative to the corresponding said interior passage, so as to define a socket for removably receiving an interconnecting member associated with an adjacent structure.

2. Apparatus as in claim 1, further comprising a panel interconnecting member having a pair of coaxially aligned and mutually interconnected stem members, and each of said stem members being configured to fit snugly within the enlarged diameter of said socket in one of said connecting members, whereby adjacent modules of said modular panel apparatus can be selectably interconnected.

3. Corner apparatus for interconnecting a member of hollow elongated members to form a polygonal frame, comprising:
   a body member;
   a pair of tubular members attached to and extending outwardly from said body member;
   means associated with each of said tubular members to selectably engage an end of a hollow elongate member; and
   said body member having means defining a socket for removably receiving an interconnecting member associated with an adjacent structure.

4. Corner apparatus as in claim 3, wherein:
   each of said tubular members is selectably expandable and contractable so as to engage a said hollow elongate member; and
   said means associated with each said tubular member comprises a hollow interior passage within said tubular member;
   said hollow interior passage being threaded to receive a screw, and having means operative in response to the position of the screw to control the expansion and contraction of said tubular member;
   said body member having separate internal access passages which are respectively axially aligned with said interior passages of each said tubular member so as to provide operative access to said screws in said interior passages of said tubular members; and
   at least one of said access passages in said body member having a portion of enlarged diameter relative to the corresponding axially aligned interior passage; and
   said enlarged portion communicating with the exterior of said body member so as to form said socket defining means.

5. Corner apparatus as in claim 4, further comprising:
   a panel interconnecting member having a pair of coaxially aligned and mutually interconnected stem members; and
   each of said stem members being configured to fit snugly within the enlarged diameter of said socket in one of said connecting members, whereby adjacent modules of said modular panel apparatus can be selectably interconnected.

* * * * *